United States Patent [19]

Wilkinson

[11] 4,403,779

[45] Sep. 13, 1983

[54] SEALS FOR LIQUID-TIGHT CLOSURE BETWEEN ROTARY COMPONENT AND PARTITION

[75] Inventor: Samual C. W. Wilkinson, Chichester, England

[73] Assignee: Crane Packing Limited, Slough, England

[21] Appl. No.: 443,149

[22] Filed: Nov. 19, 1982

[30] Foreign Application Priority Data

Nov. 21, 1981 [GB] United Kingdom ............... 8135135

[51] Int. Cl.³ ..................... F16J 15/18; F16J 15/44; F16J 15/46
[52] U.S. Cl. ................................ 277/27; 277/53; 277/83; 277/177
[58] Field of Search ..................... 277/1, 3, 26–28, 277/53, 83, 165, 173–175, 177, 226, 237 A, DIG. 4

[56] References Cited

U.S. PATENT DOCUMENTS

| 838,707 | 12/1906 | Godley | 277/DIG. 4 X |
| 3,088,555 | 5/1963 | Karlgaard | 277/1 X |
| 4,159,828 | 7/1979 | Ostling et al. | 277/53 X |
| 4,177,997 | 12/1979 | Cartwright | 277/83 X |
| 4,204,689 | 5/1980 | Johansson | 277/27 |

FOREIGN PATENT DOCUMENTS

| 512372 | 9/1939 | United Kingdom | 277/83 |
| 982860 | 2/1965 | United Kingdom | 277/177 |

Primary Examiner—Robert S. Ward, Jr.
Attorney, Agent, or Firm—Kemon & Estabrook

[57] ABSTRACT

A seal for producing a liquid-tight closure between a rotary component and a partition separating two chambers, where the rotary component penetrates the partition, said seal includes a retaining means which may be secured to the partition so that it surrounds the rotary component. The retaining means locates an annular floating member, so that it is free to float radially. The annular floating member has a small clearance about the rotary component and is provided with sealing means which will close the gap between the floating member and the rotary component to form a liquid-tight closure, upon exposure to liquid, following the flooding of one of the chambers.

7 Claims, 3 Drawing Figures

SEALS FOR LIQUID-TIGHT CLOSURE BETWEEN ROTARY COMPONENT AND PARTITION

The invention relates to seals and in particular seals for use where a rotary component passes through a liquid-tight partition which separates one chamber from another.

In order to provide water-tight bulkheads in ships, it is necessary to provide sealing means where the bulkheads are penetrated by propeller shafts or large pump drive-shafts. Hitherto this requirement has been met by a simple bearing with grease lubrication or a packed gland, each incorporating facilities for accommodating some degree of out-of-centre and angular movement. A major problem with these forms of seal is that, as shaft speeds increase there is a possibility that heat will be generated by the sealing element which may lead to stress failure of the shaft. A further disadvantage of this form of seal is that the sealing elements will only be required at very irregular intervals, probably several years after their installation, and as they are subjected to continuous wear, they must be serviced regularly in order to ensure that they are in a serviceable condition, when required.

The present invention provides a sealing element which remains substantially inoperative until one side of the bulkheat or partition is flooded. Consequently there will be little frictional engagement between the sealing element and the shaft or wear of the sealing element, until the sealing element is required.

According to one aspect of the present invention, a seal for producing a liquid-tight closure between a rotary component and a partition separating two chambers, where the rotary component penetrates the partition, said seal comprises; a retaining means adapted to be mounted on the partition, so that it surrounds the rotary component as it passes through the partition, said retaining means defining an annular formation; said annular formation overlapping radially, a corresponding formation on the outer portion of an annular floating member, to locate said annular floating member axially while permitting a degree of radial movement, the inner surface of the floating member being dimensioned to give a small clearance with the rotary component; and sealing means associated with either the internal surface of the floating member or the opposed surface of the rotary component; said sealing means being arranged to seal the gap between the floating member and the rotary component, and opposed surfaces of the formations defined by the retaining means and the floating member being arranged to make sealing engagement, upon exposure to liquid, following flooding of one of the chambers separated by the partition.

As the sealing means is only in sealing engagement when one of the chambers is flooded, in normal operation, it will be subjected to little wear and there will be little frictional engagement between the sealing means and the rotating component, to cause heating problems. As the floating member is free to move radially of the axis of the rotary component, the clearance between its inner surface and the rotary component may be made quite small, while still accommodating out-of-centre and angular movement of the rotary component. Furthermore the sealing action is not dependant on rotation of the component and will consequently function whether the component is rotating or not.

The sealing means may be arranged to be brought into sealing engagement, upon flooding of one of the chambers separated by the partition, as the result of the pressure differential exerted by the liquid. Alternatively, the sealing means may be brought into action as the result of a physical change in the sealing means resulting from its exposure to the liquid, for example the sealing means may swell upon contact with the liquid.

Various embodiments are now described, by way of example only, with reference to the accompanying drawings in which.

Figure 1:
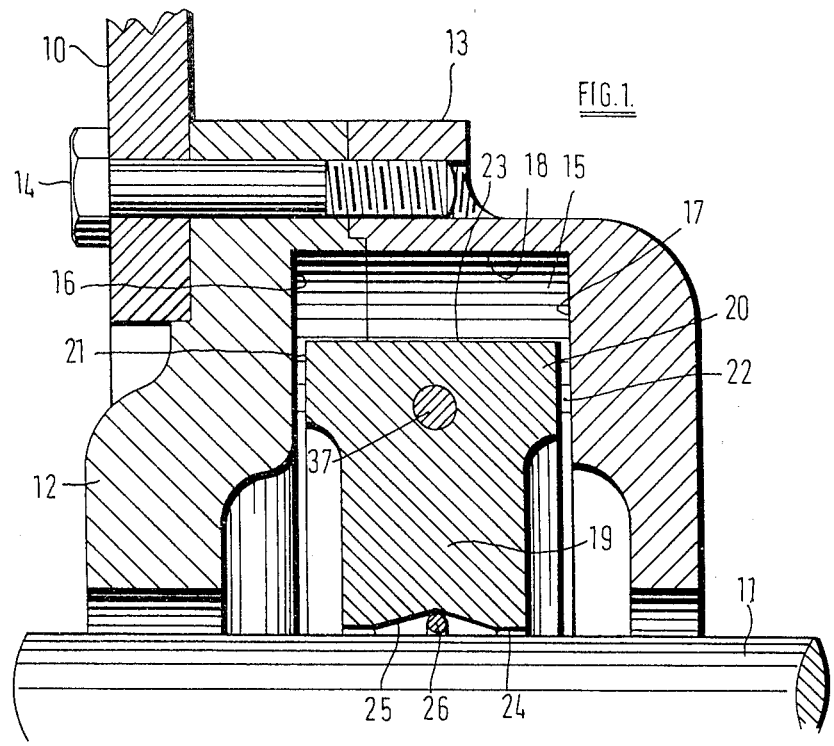
FIG. 1 shows a part-sectional elevation of a seal formed in accordance with the present invention.

As illustrated in FIG. 1 a seal for sealing a ship's bulkhead 10 where it is penetrated by a propeller shaft 11, comprises a retaining means in the form of a two-part housing 12, 13, which is bolted to the bulkhead 10 by means of a series of circumferentially spaced bolts 14, so that it surrounds the propeller shaft 11. The housing 12, 13, defines an annular recess 15 having a pair of opposed radial surfaces 16, 17, joined by a cylindrical surface 18.

An annular floating member 19 is mounted within the housing 12, 13, the outer portion 20 of the member 19 being located between the radial surfaces 16, 17, of the recess 15. A small clearance is provided between the radial surfaces 16, 17, and the opposed surfaces 21, 22, of the outer portion 20 of the member 19, thus permitting limited axial movement of the member 19. The opposed surfaces 16, 21 and 17, 22, are lapped, so that when they are in engagement, they will provide a liquid-tight seal. A clearance is also provided between the outer periphery 23 of the member 19 and the cylindrical surface 18 of the recess 15, so that the member 19 is free to move radially, with the shaft.

Floating member 19 surrounds the shaft 11, there being a small clearance between the inner periphery 24 of the member 19 and the shaft 11. The inner periphery 24 of the member 19 is provided with a groove 25 the sides of which are inclined to the axis of the shaft 11. An elastomeric O-ring 26 is slidingly located around the shaft 11, within the groove 25, so that when in the central portion of the groove 25, it will be clear of the surface of the groove 25 over most of its circumference.

In operation, under normal circumstances, when both sides of the bulkhead are free from water, the O-ring 26 is free to revolve around or with the shaft 11 and will only be in partial, light contact with the floating member 19. When one side of the bulkhead is flooded, the pressure of liquid on that side of the floating member 19, will force the floating member 19 into engagement with one of the radial surfaces 16, 17, of the housing 12, 13, so that a liquid-tight seal is produced between the opposed surfaces 16 and 21 or 17 and 22. The liquid pressure will also force the elastomeric O-ring 26 into contact with the inclined wall of the groove 25 and the shaft 11, thereby forming a seal at the inner periphery of the floating member 19 and forming a liquid-tight colsure between the bulkhead 10 and shaft 11.

In an alternative embodiment, the elastomeric O-ring 26 may be located within a groove on the shaft 11, the O-ring 26 and the groove 25 being dimensioned so that as the floating member 19 moves over into sealing engagement with the housing 12, 13, the inclined wall of the groove 25 also engages the O-ring 26.

Figure 2:
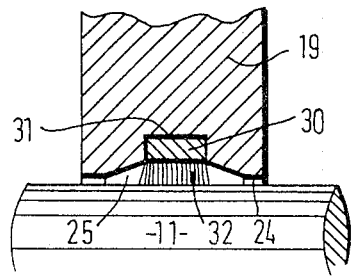
FIG. 2 shows a part-sectional view of an alternative form of sealing means that may be used in the seal construction shown in FIG. 1.

In the embodiment illustrated in FIG. 2, in place of the O-ring 26, a strip of material is located in a recess 31 within the groove 25. This strip 30 is covered by strands 32 of material, for example nylon which are like soft bristles, these strands 32 extend into the groove 25 and under normal circumstances are swept lightly over the surface of the shaft 11. The strands 32 are not loaded onto the shaft 11 to a sufficient extent to cause wear, but if desired they may be loaded with a lubricant such as oil. When one side of the bulkhead 10 becomes flooded, the pressure of water deflects the strands 32 into the narrow gap between the floating member 19 and the shaft 11 on the side opposite to that which is flooded, thus blocking the gap and effecting a seal between the floating member 19 and the shaft 11.

Figure 3:
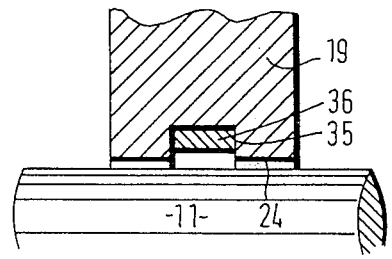
FIG. 3 shows a part-sectional view of a further alternative form of sealing means that may be used in the seal construction shown in FIG. 1.

FIG. 3 shows an alternative embodiment in which the inner periphery 24 of the floating member 19, is provided with an annular recess 35, in which is located an inset 36 of material which will absorb liquid and swell. In this manner, under normal circumstances when both sides of the bulkhead 11 are dry, the inset 36 will be positioned clear of the shaft 11 and will not be subject to wear. When one side of the bulkhead 10 is flooded, water seeping through the gap between the shaft 11 and floating member 19, will be absorbed by the material and the inset 26 will swell to block the gap between the floating member 19 and shaft 11, thereby forming a fluid-tight seal. The inset 36 may be made of a natural material for example softwood or maybe a suitable synthetic material. The material may be permanently anchored in the recess 35 or may be arranged to leak into the gap between the floating member 19 and shaft 11, so that as it swells, it will seal off the gap. In the latter case, the material may conveniently be a combination of a water soluble material with a sealant in the form of fibres or particles which will swell in contact with liquid, so that as the water soluble material dissolves the fibres or particles are free to fill the gap between the floating member 19 and shaft 11.

In the embodiment described above, the floating member 19 permits free out-of-centre rotation and angular movement of the shaft, so that under normal circumstances, the sealing member would not be subject to undue wear. Preferably the floating member 19 is formed from a light material such as a reinforced plastic, and is preferably formed in two halves which are held together by tangential bolts 37, in order to facilitate assembly of the seals. Alternative materials and forms of construction may however be used.

I claim:

1. A seal for producing a liquid-tight closure between a rotary component and a partition separating two chambers, where the rotary component penetrates the partition, said seal comprising; a retaining means adapted to be mounted on the partition, so that it surrounds the rotary component as it passes through the partition, said retaining means defining an annular formation;

said annular formation overlapping radially, a corresponding formation on the outer portion of an annular floating member, to locate said annular floating member axially while permitting a degree of radial movement, the inner surface of the floating member being dimensioned to give a small clearance about the rotary component; and sealing means associated with either the internal surface of the floating member or the opposed surface of the rotary component; said sealing means being arranged to seal the gap between the floating member and the rotary component and opposed surfaces of the formations defined by the retaining means and the floating member being arranged to make sealing engagement, upon exposure to liquid, following flooding of one of the chambers separated by the partition.

2. A seal according to claim 1 in which the retaining means defines an annular recess open inwardly, the floating member being located between radial walls of the recess and having radially opposed surfaces which are capable of making liquid-tight engagement with the walls of the recess, in response to the axial pressure applied to the floating member by liquid in one of the chambers, upon the flooding of that chamber.

3. A seal according to claim 1 in which the sealing means seals the gap, between the inner surface of the floating member and the opposed surface of the rotary component, upon flooding of one of the chambers separated by the partition, as a result of the pressure differential exerted by the liquid.

4. A seal according to claim 3 in which the inner surface of the floating member is provided with an annular groove with inclined walls and an elastomeric O-ring is mounted upon the rotaty component within the groove, so that when subjected to a pressure differential it will be wedged between one of the inclined surfaces of the groove and the rotary component, to form a seal therebetween.

5. A seal according to claim 3 in which the inner surface of the floating member is provided with an annular groove with inclined walls, an annular filamentary element is mounted centrally of the groove, so that its filaments brush the opposed surface of the rotary component and, upon exposure to a pressure differential are forced into the reducing gap between one of the inclined walls of the groove and the rotary component, to block the gap and form a liquid-tight seal therebetween.

6. A seal according to claim 1 in which the sealing means undergoes a physical change, upon exposure to a liquid, which causes it to close the gap between the inner surface of the floating member and the rotary component.

7. A seal according to claim 6 in which the sealing means swells on exposure to the liquid.

* * * * *